United States Patent

[11] 3,571,729

[72] Inventor Takamichi Honma
Tokyo, Japan
[21] Appl. No. 743,779
[22] Filed July 10, 1968
[45] Patented Mar. 23, 1971
[73] Assignee Nippon Electric Company, Limited
Minato-Ku, Tokyo, Japan
[32] Priority July 12, 1967
[33] Japan
[31] 42/44853

[54] PREDICTIVE GATE CIRCUIT FOR THE RECEPTION OF A PULSE-POSITION-MODULATED PULSE TRAIN
8 Claims, 4 Drawing Figs.

[52] U.S. Cl. .......... 328/109, 179/15, 307/217, 307/218, 307/234, 328/92, 329/107
[51] Int. Cl. .......... H03k 5/20
[50] Field of Search .......... 307/217, 218, 233, 234, 232; 328/109, 92, 110, 94, 111, 112, 119; 329/104, 107; 179/15 (Asynch), (APC), (AEC); 325/321—323, 143

[56] References Cited
UNITED STATES PATENTS

| | | | |
|---|---|---|---|
| 2,885,553 | 5/1959 | Albro et al. .......... | 328/39 |
| 2,984,789 | 5/1961 | O'Brien .......... | 307/234X |
| 3,065,302 | 11/1962 | Kaneko .......... | 328/110X |
| 3,136,861 | 6/1964 | Mayo .......... | 179/15 |
| 3,310,626 | 3/1967 | Cassidy, Jr. .......... | 179/15X |

*Primary Examiner*—Stanley D. Miller, Jr.
*Attorney*—Hopgood and Calimafde

ABSTRACT: A predictive gate circuit is described for screening out random error pulses occuring in a communication system utilizing pulse position modulated pulse trains. A gate is in synchronization with the incoming pulses opened at a known time corresponding to the basic interval rate of the pulse train and is held open for a duration corresponding to the position modulation range used in the pulse train. A judging circuit is employed which determines when the predictive gate is to be reset for resynchronization with the pulse train when synch is lost due to random error pulses. Several embodiments are shown with one adapted for use with a pulse position modulation communication system wherein pulse positions representative of zero modulation are suppressed at the transmitter end and regenerated in the disclosed predictive circuit.

INVENTOR.
TAKAMICHI HONMA
BY
Hopgood & Calimafde
ATTORNEYS

INVENTOR.
TAKAMICHI HONMA

BY

Hopgood & Calimafde
ATTORNEYS

PREDICTIVE GATE CIRCUIT FOR THE RECEPTION OF A PULSE-POSITION-MODULATED PULSE TRAIN

A PREDICTIVE GATE CIRCUIT

This invention relates to a gate circuit which may be used at the receiving end of a pulse-position modulation (PPM) or a pulse-time modulation (PTM) communication system and, more particularly, to a gate circuit of the kind for allowing incoming pulses to pass there through to the demodulator connected therewith only at those time intervals where the desired pulse-position modulated signal pulse train is likely to be present and not to pass at other time intervals during during which spurious pulse trains might be present and which have come to be superimposed on the desired pulse train in a random time relation with respect to that pulse train due in various causes such as the interference from the not-desired station.

In a RADA (random access discrete address) communication system, each station selects, by means of a participant-station selector such as an F–T (frequency-time) matrix, the desired signal pulse train sent out by the participant station from a number of pulses sent out by various stations. If there are a multitude of stations in simultaneous active service, pulses sent out by two or more undesired stations often have a frequency-time relation similar to that of the pulses from the desired participant station and thus pass through the participant-station selector. Disturbing pulses generated as a result of interference between the pulses from the undesired stations are commonly designated false address pulses. The false address pulses, if supplied to the demodulator together with the desired signal pulses, are error pulses which impair the S/N ratio of the demodulator output. An increase in the number of stations in simultaneous service increases the probability of occurrence of false address pulses so that the much impaired S/N ratio of the demodulator output often disables reception of the signal from the desired station. In other words, the occurrence of the false address pulses imposes an upper limit to the number of simultaneously serviceable stations.

The signal pulses used in the RADA communication system may be pulse-code modulated pulses or delta modulated pulses. Each pulse has a narrow width of about one microsecond and occurs with the probability of one-half either within a sampling period or within an integral submultiple of the sampling period. In these cases, it is possible to use a time gate circuit which, in synchronism with the sampling period or its integral submultiple, permits the desired signal pulses to pass to the demodulator. The pulse-position modulation is an alternative modulation used in the RADA communication system. In this case, the time gate circuit does not work well because the pulse position of every pulse is shifted by the modulating signal around the time position of the corresponding sampling pulse. As compared with a pulse-position modulation system not employing an accompanying time gate circuit, a pulse-code or a delta modulation system having a time gate circuit enables each station to emit 8 times as many pulses with only a slight increase in the probability of false address pulses when the same number of stations are in simultaneous service in both systems. It is to be noted, however, that with the pulse-code or the delta modulation system wherein the time intervals between the pulses emitted from the simultaneously serving stations are constant, the false address pulses do not occur at random but occur with some given time intervals and it is consequently technically difficult to prevent the time gate circuit from falling into synchronism with the false address pulses. In contrast to the pulse-code system, the system false address pulses have no periodicity in a pulse-position modulation system. Therefore, it becomes possible to increase the number of the simultaneously serving stations if it is possible to provide a type of time gate circuit for a pulse-position modulated RADA communication system.

Such a time gate circuit for a pulse-position modulation system may be comprised of a local oscillator phase-locked to the sampling frequency and means for causing the output of the phase-locked oscillator to open the gate for the same time interval as or a little longer time interval than the maximum possible position shift of time position of each pulse. That position shift is determined on the transmitter side and is preferably as small as possible. It requires, however, a considerable time to phase-lock this time gate circuit and to make it work stationarily after the initiation of transmission because phase locking must be carried out on the receiver side by deriving the sampling frequency from the incoming modulated signal pulses. This is objectionable because the effective number of simultaneously serving stations decrease as a result of the loss in the emitted pulses unless some means are installed to distinguish quickly after initiation of a call whether the participant station is busy or not.

An object of this invention is therefore to provide a gate circuit to be used with a pulse-position modulation communication system wherein use is not made of the objectionable phase-locked local oscillator.

Another object of this invention is to provide a gate circuit whose duration of opening may even be shorter than the maximum possible shift of the time position of each pulse.

A further object of this invention is to provide a gate circuit which reduces the chances of passage of the undesirable error pulses.

Still another object of this invention is to provide a gate circuit which can raise the S/N ratio of the output of the demodulator connected therewith.

A predictive gate circuit of this invention comprises a first and a second gate circuit, one of the input terminals of each gate circuit being connected with a signal input terminal to which incoming pulses are supplied, said incoming pulses being or including a pulse-position modulated signal pulse train to be utilized. The predictive gate circuit further comprises a control circuit which is responsive either to the output pulse of the first or the second gate circuit or to the logic sum of the output pulses of the first and the second gate circuits and which opens the first gate circuit during a time duration starting from a predetermined time before lapse of the sampling period for the pulse-position modulated signal pulse train and ending a predetermined time after lapse of the sampling period. The predictive gate circuit still further comprises a judging control circuit which is responsive to the output pulses of the first gate circuit and which closes the second gate circuit when at least one output pulse appears at the output of the first gate circuit so that a pulse-position modulated signal pulse train is likely to reach the signal input terminal and open the second gate circuit when at least one pulse appears at the output of the first gate circuit so that there is little or no possibility of a pulse-position modulated signal pulse train reaching the signal input terminal. The signal output terminal of the predictive gate circuit with which a utilization circuit such as a demodulator is connected may be coupled with the output terminal of either the first gate circuit or the first-mentioned control circuit.

Operation of the predictive gate circuit of this invention is based on the statistical character of a pulse-position modulated signal pulse train such that each pulse of the signal pulse train appears within a predetermined time duration which lags a predetermined period behind the preceding pulse of the signal pulse train. In other words, the predictive gate circuit predicts from the time of arrival of an incoming pulse the time duration within which a succeeding incoming pulse will arrive and actually cause these incoming pulses to pass therethrough when such pulses belong to the desired pulse-position modulated signal pulse train. Consequently, the predictive gate circuit of this invention needs no complicated means for extracting the sampling frequency at the receiving end from the incoming pulses.

This invention will now be explained more specifically with reference to the accompanying drawings, in which.

Figure 1:
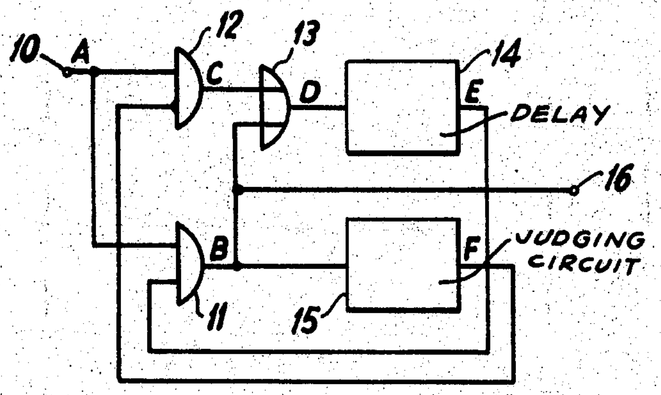
FIG. 1 is a block diagram of a first embodiment of this invention.
Figure 2:
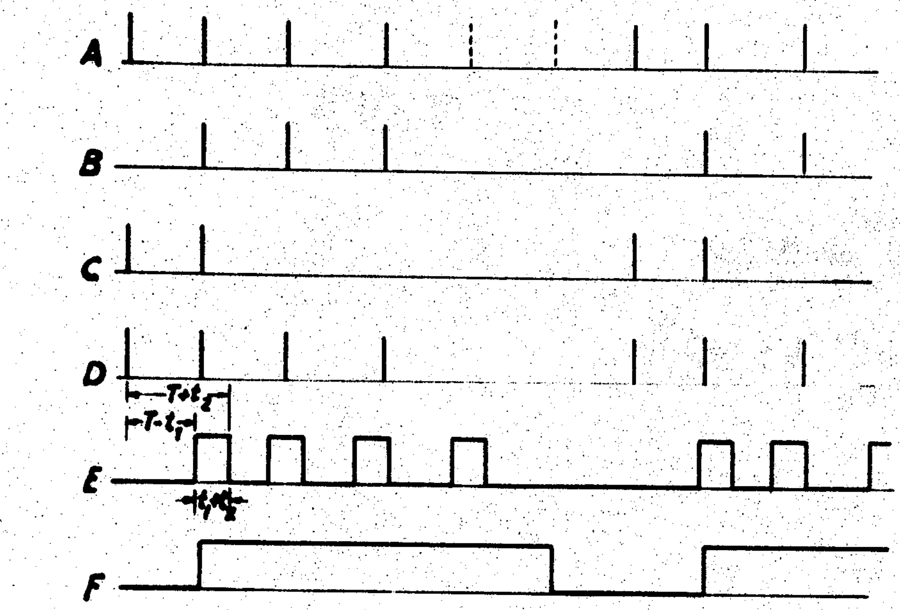
FIG. 2 is a waveform diagram showing pulses at various points in the first embodiment illustrated in FIG. 1.

Referring at first to FIGS. 1 and 2, a first embodiment of this invention shown in FIG. 1 will be described. The embodiment comprises a signal input terminal 10 for receiving a pulse-position modulated signal pulse train A such as shown in FIG. 2A on which undesired pulses may be present a two-input first gate circuit or And circuit 11 has one input terminal connected with the signal input terminal 10; and a two-input second gate circuit or inhibit circuit 12 has an input terminal also connected with the signal input terminal 10. A two-input OR circuit 13 has input terminals connected with the respective output terminals of the AND and the inhibit circuits 11 and 12 for producing, each time a pulse appears at least one of the output terminals of such gate circuits 11 and 12 as shown in FIGS. 2B and C, a pulse in the manner illustrated in FIG. 2D; A delay circuit or control circuit 14 has an input terminal connected with the output terminal of the OR circuit 13 for producing, when each output pulse D of the OR circuit 13 is supplied, a delayed and lengthened pulse shown in FIG. 2E which rises a predetermined time $t_1$ before lapse of the sampling period T for the pulse-position modulated signal pulse train A and falls a predetermined time $t_2$ after lapse of the sampling period T. Means are provided for leading the delayed and lengthened pulses E to the other input terminal of the AND circuit 11 to open the latter during the presence of the pulses E, and a judging circuit 15 has an input terminal connected with the output terminal of the AND circuit 11. Circuit 15 produces a long-lasting pulse shown in FIG. 2F which rises when a pulse B appears at the output terminal of the AND circuit 11 for the first time after no pulse has appeared over the sampling period T and which decays when no pulse appears at the output terminal for a preselected time (in this embodiment, 2T) longer than the sampling period T or, stated more generally, which lasts as long as the pulse-position modulated signal pulse train A is likely to be present and remains suppressed as long as the train is not; means are provided for leading the long-lasting pulses F to the inhibit input terminal of the inhibit circuit 12 to render the latter nonconductive; and a signal output terminal 16 is connected with the output terminal of the AND circuit 11.

Referring further to FIGS. 1 and 2, the operation of the first embodiment will be explained. In the event that no pulses are supplied to the signal input terminal 10, no output appears at the delay and the judging circuits 14 and 15 so that the AND and the inhibit circuits 11 and 12 remain nonconductive and conductive, respectively. When a pulse reaches the signal input terminal 10 under these circumstances, this incoming pulse is applied to the delay circuit 14 through the inhibit and the OR circuits 12 and 13. The delay circuit 14 produces a delayed and lengthened pulse E of a predetermined duration $t_1+t_2$ nearly the sampling period T after the application thereto of an input pulse D. This delayed and lengthened pulse E is supplied back to the AND circuit 11 to render the latter conductive for the predetermined duration $t_1+t_2$. When a pulse-position modulated signal pulse train A reaches the signal input terminal 10, a second incoming pulse A reaches the AND circuit 11 while this circuit 11 is maintained conductive by the delayed and lengthened pulse E produced by the first incoming pulse. This time relation will later become more apparent from the statistical character of the pulse-position modulated signal pulse train A. The second incoming pulse thus passes through the AND and the inhibit circuits 11 and 12 as shown in FIGS. 2B and C. It is to be noted that the inhibit circuit 12 is still conductive at this stage. Each pulse B appearing at the output terminal of the AND circuit 11 is supplied to the delay circuit 14 through the OR circuit 13 and to the judging circuit 15. The pulse B supplied to the delay circuit 14 produces a second delayed and lengthened pulse E, which makes the AND circuit 11 again conductive for the predetermined duration $t_1+t_2$ to let a third incoming pulse A pass therethrough. In a similar manner, the incoming pulses of the pulse-position modulated signal pulse train A successively pass through the AND circuit 11 and reach the signal output terminal 16. On the other hand, the pulse B supplied to the judging circuit 15 produces a long-lasting pulse F, which turns the inhibit circuit 12 nonconductive to inhibit the passage of the incoming pulses A. The third and the successively following incoming pulses of the pulse-position modulated signal pulse train A thus do not pass through the inhibit circuit 12 but instead reach the signal output terminal 16 through the AND circuit 11 and in the manner just mentioned. The long-lasting pulse F ceases when the preselected time, 2T for this embodiment, has passed after the last incoming pulse, to reset the inhibit circuit 12 to the conductive state and thus to make the predictive gate circuit ready for another incoming pulse that will later reach the signal input terminal 10. If the second incoming pulse is a random error pulse, this pulse may pass through the inhibit circuit 12 but scarcely passes through the AND circuit 11 during the predetermined duration $t_1+t_2$ and thus does not pass through the predictive gate circuit. In the event that the first incoming pulse that has reached the signal input terminal 10 is a random error pulse, a second incoming pulse seldom reaches the AND circuit 11 while the same is conductive. The AND circuit 11 returns to the nonconductive state after the lapse of the predetermined duration $t_1+t_2$, while the inhibit circuit 12 remains conductive all the time. Thus, the predictive gate circuit is ready for dealing with any incoming pulse to follow. It is to be understood that the judging circuit 15 thus judges whether the input to the signal input terminal 10 is presumably a desired pulse-position modulated signal pulse train A or a random error pulse train.

In practice, the number of pulse-position modulated signal pulses A per unit time is about $8\times10^3$ pulses per second and the sampling period T for such pulses is 125 microseconds. If a six-microsecond duration is selected as the predetermined duration $t_1+t_2$ and in view of this statistical character of the pulse-position modulated signal pulse train A, the ratio of the conductive time duration of the AND circuit 11 to the sampling period T is $6/125 \doteqdot 1/21$ while a pulse-position modulated signal pulse train A is being received. This means that it is possible to let the whole pulses of the pulse-position modulated signal pulse train A through the predictive gate circuit of this invention and to make only one twenty-first of the random error pulses pass therethrough. In other words, the predictive gate circuit of this invention allows passage of a pulse train whose minimum and maximum pulse spacings are $T-t_1$ and $T+t_2$ respectively, or whose maximum and minimum repetition frequencies $F_{max}$ and $F_{min}$ are $1/(T-t_1)$ and $1/(T+t_2$, respectively.

In a pulse-position modulated signal pulse train A wherein the sampling frequency is F ($=1/T$), the maximum shift of the pulse time position is $\Delta T$, and the frequency of the modulating sinusoidal signal is $f_m$, the minimum and the maximum pulse spacings $T_{min}$ and $T_{max}$ are given by $$T_{min}=T-2\sin\left(\frac{\pi f_m}{F}\right)\Delta T$$

and $$T_{max}=T+2\sin\left(\frac{\pi f_m}{F}\right)\Delta T$$

respectively, provided $$2\sin\left(\frac{\pi f_m}{F}\right)\Delta T\ll1$$

From these equations, it is seen that each pulse of the pulse-position modulated signal pulse train A follows the preceding pulse within a time duration of $$4\sin\left(\frac{\pi f_m}{F}\right)\Delta T\ \text{(sec.)}$$

said time duration starting a predetermined time $T_{min}$ after that preceding pulse and ending another predetermined time $T_{max}$ after that preceding pulse. If the predetermined times $t_1$ and $t_2$ are given by $$t_1=t_2\geqq2\sin\left(\frac{\pi f_m}{F}\right)\Delta T$$

it is possible for the pulse-position modulated signal pulse train A to pass through the predictive gate circuit of this invention without any loss. In other words, the duration of opening of the predictive gate circuit or the predetermined duration $t_1+t_2$ of conduction of the AND circuit 11 should be given by $$t_1+t_2 \geqq 4 \sin\left(\frac{\pi f_m}{F}\right)\Delta T \qquad (1)$$

The duration of opening of the phase-locked-oscillator time gate circuit mentioned in the preamble of this specification must not be less than 2ΔT. It is possible therefore to obtain a shorter duration of opening with a predictive gate circuit of this invention if $$2 \sin\left(\frac{\pi f_m}{F}\right)\Delta T \leqq 1$$

Inasmuch as the information to be transmitted by pulse-position modulation is generally the voice and inasmuch as the frequency distribution of the voice is at a maximum at about 300 Hz. and decreases at higher frequencies in approximately inverse proportion to the square of the frequency, 800 Hz. is typical as the modulating frequency $f_m$. Consequently, the inequality (1) gives 1.236ΔT as the minimum of the duration of opening of the predictive gate circuit, which is obviously shorter than that of the phase-locked-oscillator time gate circuit.

In further connection with the expression (1), it should be mentioned that the maximum time shift ΔT at the transmitter end is ±5 microseconds for the particular example being considered.

It should furthermore be noted here that with a PPM demodulation system utilizing a harmonic component of the PPM signals disclosed in my copending Patent Application Ser. No. 736,516, filed on Jun. 12, 1968, entitled PPM Demodulation System Utilizing a Harmonic Component of PPM signals, and assigned to the assignee of the present application, it is possible to raise the S/N ratio to 19 db even if as much as $1.33\times10^3$ random error pulses per second may intermingle in the incoming pulse-position modulated signal pulse train A. With this demodulation system connected with the signal output terminal 16 of the predictive gate circuit, the same S/N ratio of 19 db is achievable even when $27.9\times10^3$ (1.33×1) error pulses per second may intermingle in the incoming signal pulse train A. This is a remarkable improvement, when compared with the conventional demodulators wherein the tolerable S/N ratio of 10 db for the demodulator output is reached by as little as $1.6\times10^3$ error pulses per second.

Referring still further to FIG. 1, it should be understood that the signal output terminal 16 may instead of connection to the output terminal of the AND circuit 11, be coupled the output terminal of the delay circuit 14 provided the signal output may have a pulse width commensurate with of the duration of opening of the predictive gate circuit. Also, it is possible to connect a monostable multivibrator (not shown) with the output terminal of the delay circuit 14 and to connect the signal output terminal 16 with the output terminal of this multivibrator, in order to adjust the pulse width of the output signal to the demodulation to be performed by the demodulator (not shown) connected with the signal output terminal 16.

Among the components shown in FIG. 1, the AND circuit 11, the inhibit circuit 12, the delay circuit 14, and the judging circuit 15 are essential to this invention. The OR circuit 13 may be dispensed with, because it is possible to employ two similar delay circuits to whose input terminals the output terminals of the AND and the inhibit circuits 11 and 12 are led, respectively, and from whose output terminals the inhibit input for the inhibit circuit 12 may be obtained. Furthermore, the delay circuit 14 may instead of the usual delay circuit be a counter circuit or the like which can produce an output for controlling the inhibit circuit 12 according to arrangement the timing mentioned above.

In connection with the above, it should be noted that the first embodiment explained with reference to FIGS. 1 and 2 allows a little more random error pulses to pass therethrough in the event that this embodiment is employed in a pulse-position modulation communication system disclosed in my copending Pat. application Ser. No. 718,146 filed on Apr. 12, 1968, entitled Pulse Position Modulation Communication Systems and assigned to the assignee of the present invention, wherein the pulse-position modulated signal pulses are suppressed while voice or other information level is substantially zero. The reason for this disadvantage is this. When a pulse disappears from the incoming pulse-position modulated signal pulse train A, the judging circuit 15 keeps the inhibit circuit 12 nonconductive for a preselected time. So long as the inhibit circuit 12 remains closed, the AND circuit 11 never becomes conductive. Therefore, no output pulses appear at the output terminals of the AND, the inhibit, and the OR circuits 11, 12, and 13. The judging circuit 15 now judges that no pulse-position modulated signal pulse train is at the signal input terminal 10 and resets the predictive gate circuit for future operation. Inasmuch as the judging circuit 15 requires a little more time to perform the judgement and inasmuch as each pulse suppression resets the inhibit circuit 12 to the conductive state, not only loss occurs in the pulse-position modulated signal pulses to be gated through but also deterioration occurs in the desired blanking performance of the predictive gate circuit for the random error pulses. In other words, the power-saving feature of my last-mentioned copending application wherein pulses representing zero modulation amplitude are suppressed, tends to cause excessive resets of the described predictive circuit of FIG. 1 accompanied by undesirable losses of pulses.

Figure 3:
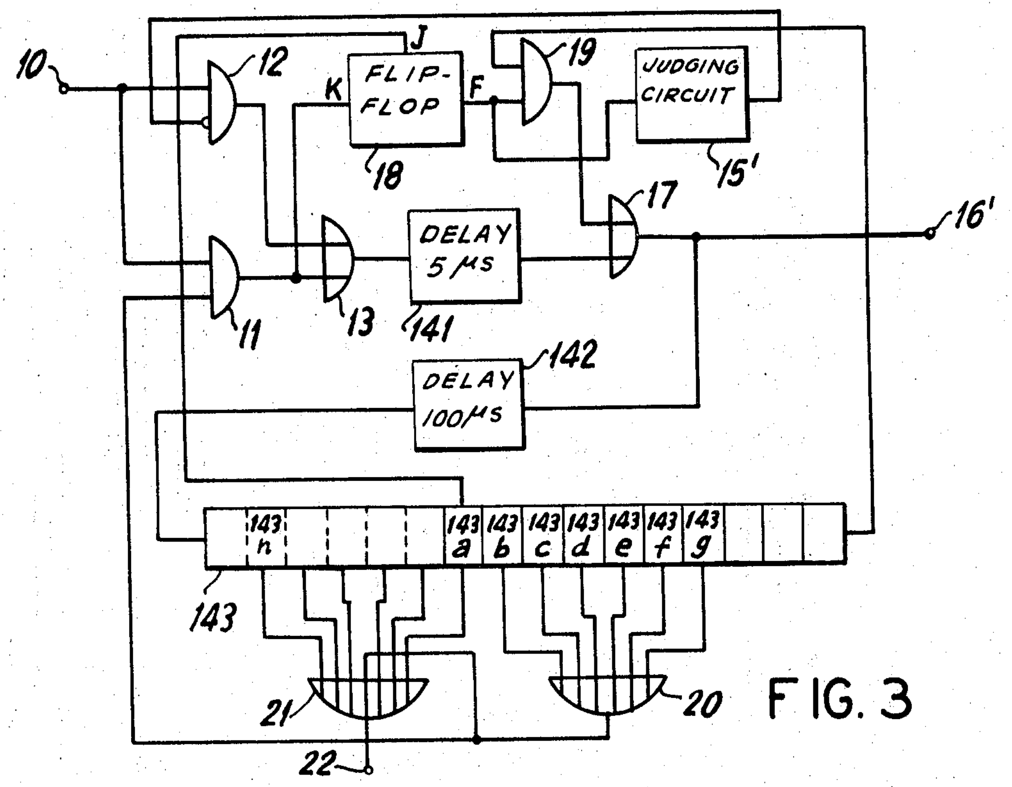
FIGS. 3 and 4 are block diagrams of a second and a third embodiment of this invention, respectively.

Referring to FIG. 3, a second embodiment of this invention will be described, which is designed as a predictive gate circuit for a pulse-position modulated signal pulse train A whose sampling frequency F and period T are 8 kHz. and 125 microseconds, respectively. This embodiment, although somewhat complicated in construction as compared with the first embodiment, has superior performance thereto and comprises: a signal input terminal 10; a two-input first AND circuit 11 one of whose input terminals is connected with the signal input terminal 10; and a two-input inhibit circuit 12 whose input terminal connected with the signal input terminal 10. A two-input first OR circuit 13 has its input terminals connected with the output terminals of the first AND and the inhibit circuits 11 and 12, respectively; and a first delay circuit 141 of five-microsecond delay has an input terminal is connected with the output terminal of the first OR circuit 13. A two-input second OR circuit 17 has one input terminal is connected with the output terminal of the first delay circuit 141; a second delay circuit 142 of 100-microsecond delay has an input terminal connected with the output terminal of the second OR circuit 17; and a third delay circuit 143 of 25-microsecond delay has input terminal connected with the output terminal of the second delay circuit 142 and is composed of 25 cascaded monostable multivibrators, each producing a pulse of one-microsecond width whose leading edge coincides with the trailing edge of the pulse produced by the preceding multivibrator. This embodiment also comprises a J–K flip-flop circuit 18 whose J and K input terminals are respectively connected with the output terminal of the sixteenth multivibrator 143*a* of the third delay circuit 143 and the output terminal of the first AND circuit 11, the J–K flip-flop produces at its output terminal F an "off" output signal or pulse irrespective of the previous state of the output signal in the absence of input signal on terminal in the presence of an input signal on J and the K input terminals. Conversely, the J–K flip-flop produces an "on" output signal irrespective of the previous output signal when there is an input signal on the J and when there is no input signal on the K input terminal, and retains the J–K flip-flop previously established output signal when the J and K input terminals receive no input signals. This embodiment further comprises a judging circuit 15′ whose input and output terminals are connected with the output terminal F of the J–K flip-flop circuit 18 and the inhibit input terminal of the inhibit circuit 12. The judging circuit 15 is adapted to produce an output pulse for placing the inhibit circuit 12 into the nonconductive state when the J–K flip-flop circuit 18 produces an "on" output signal followed by another within the sampling period T and to produce no output pulse so as to put the inhibit circuit 12 into the conductive state when either an "on" or an "off" output signal appears at the output terminal F for a preselected duration longer than the sampling period T. This embodiment still further comprises a two-input second AND circuit 19 whose input terminals are connected with the output terminal of the third delay circuit 143 and the output terminal F of the J–K flip-flop circuit 18, respectively, and whose output terminal is connected with the other input terminal of the second OR circuit 17. A six-input third OR circuit 20 has its input terminals connected with the 17th through the 22nd multivibrators 143*b*, 143*c*, ..., and 143*g* of the third delay circuit 143, respectively, and an output terminal connected with the other input of the first AND circuit 11 and which serves to render the first AND circuit 11 conductive for six microseconds during which the six multivibrators 143*b*, 143*c*, ..., and 143*g* are successively producing the one-microsecond pulses. A at-least-three-input fourth OR circuit 21 has its input terminals are connected with the *n*-th ($n \leq 15$) through the 16th multivibrators 143*n*, ..., and 143*a* of the third delay circuit 143 and with the output terminal of the third OR circuit 20, respectively; a signal output terminal 16′ is connected with the output terminal of the second OR circuit 17; and a control-signal output terminal 22 is connected with the output terminal of the fourth OR circuit 21.

Referring further to FIG. 3, operation of the second embodiment will be explained. When a pulse reaches the signal input terminal 10, this incoming pulse is applied to the first delay circuit 141 through the inhibit and the first OR circuits 12 and 13. After the five-microsecond delay provided by the first delay circuit 141, a pulse appears at the signal output terminal 16′ and at the same time reaches the second delay circuit 142. After the 100-microsecond delay, the pulse is supplied to the third delay circuit 143. 121 microseconds after the incoming pulse reaches the signal input terminal 10, a pulse of one-microsecond width appears at the output terminal of the sixteenth multivibrator 143*a*. The one microsecond pulse is supplied to the J input terminal of the J–K flip-flop circuit 18 to produce at its output terminal F an "on" output signal. 121microseconds after the arrival of the incoming pulse, another pulse of one-microsecond width appears at the output terminal of the seventeenth multivibrator 143*b*. Similar one-microsecond pulses successively appear at the respective output terminals of the following multivibrators 143*c*, ..., and 143*g*. Thus, a continuous pulse of six-microsecond duration appears at the output terminal of the third OR circuit 20 to put the first AND circuit 11 into conductive state.

In case a pulse-position modulated signal pulse train A is supplied to the signal input terminal 10, a second incoming pulse reaches the signal input terminal 10 within the six-microsecond period to pass through the first AND circuit 11. With an input signal supplied from the first AND circuit 11 at the K input terminal of the J–K flip-flop circuit 18, that the output signal at the output terminal F now turns "off, " which was switched to "on" by the one-microsecond pulse supplied from the sixteenth multivibrator 143*a*. The second incoming pulse having passed through the first AND circuit 11 passes through the same route as the first incoming pulse did and reaches the sixteenth multivibrator 143*a* eventually to produce another "on" output signal at the output terminal F of the J–K flip-flop circuit 18. Thus, the output signal at the output terminal F assumes the "on" state 120 microseconds after the arrival of each incoming pulse at the signal input terminal 10 and returns from "on" to "off" at that time point within the six-microsecond period at which the next following incoming pulse passes through the first AND circuit 11 to reach the K input terminal. Inasmuch as the J–K flip-flop circuit 18 produces "on" output signals, each followed by another within the sampling period T, the judging circuit 15′ continuously sends an inhibit input to the inhibit circuit 12. Consequently, the second and the following incoming pulses do not pass through the inhibit circuit 12 but pass through the first AND circuit 11. The "on" output signal opens the second AND circuit 19 from the time point 122 microseconds after the arrival of each incoming pulse of the pulse-position modulated signal pulse train A until that time point during the six-microsecond period at which the following incoming pulse arrives at the signal input terminal 10. On the other hand, the output one-microsecond pulse of the third delay circuit 143 appears 130 microseconds after the arrival of each incoming pulse. Therefore, what reaches the second OR circuit 17 is the output pulse of the first delay circuit 141. In this manner, the predictive gate circuit of FIG. 3 allows the pulse-position modulated signal pulse train A to pass therethrough with the five-microsecond delay given by the first delay circuit 141.

Under these circumstances where the predictive gate circuit of FIG. 3 operates stationarily, random error pulses may reach the signal input terminal. An incoming random error pulse scarcely reaches the first AND circuit 11 during the six-microsecond period. The random error pulses can neither pass through the first AND circuit 11 nor the inhibit circuit 12. Even though the inhibit circuit 12 may still be conductive for the second incoming pulse of the pulse-position modulated signal pulse train A, this matters little for the desirable operation of the predictive gate circuit.

In case the first incoming pulse is one of a series of random error pulses, the next following incoming pulse seldom reaches the signal input terminal 10 during the six-microsecond period. With no input signal to the K input terminal, the J–K flip-flop circuit 18 retains that state of the "on" output signal appearing at the output terminal F into which it was driven by one-microsecond pulse supplied from the 16th multivibrator 143*a*. The judging circuit 15′ thus sends an inhibit input to the inhibit circuit 12. Therefore, the following pulses, if any, can neither pass through the first AND circuit 11 nor the inhibit circuit 12. Under these circumstances, the second AND circuit 19 is kept open. Consequently, the one-microsecond output pulse of the third delay circuit 143 produced by the first incoming error pulse passes through the second AND circuit 19 to the second OR circuit 17. In this manner, pulses appear at the signal output terminal 16′, spaced regularly by the 125-microsecond period given by the second and the third delay circuits 142 and 143. When the "on" output signal at F has lasted for that preselected duration which is longer than the sampling period T, the judging circuit 15′ stops to send the inhibit input to the inhibit circuit 12. Thus, the predictive gate circuit is reset for any future incoming pulses.

Referring still further to FIG. 3, it should be seen that the pulses spaced regularly by 125 microseconds successively produce the continuous six-microsecond pulses. This is also true even if the incoming pulse was not a random error pulse but one of the desired pulse-position modulated pulses. The regularly spaced pulses therefore serve as if they are incoming pulse-position modulated pulses having no time shift $\Delta T$. Thus, the predictive gate circuit of FIG. 3 produces such "as-if" incoming pulse-position modulated signal pulses during the pulse-suppression accomplished in accordance with my last-mentioned copending application. In case of such pulse compression a true incoming signal pulse will eventually reach the AND circuit 11 during the six-microsecond period provided by an "as-if" incoming pulse-position modulated pulse, and it is possible to obviate the objectionable reset of the inhibit circuit 12 and thus the disadvantage mentioned in conjunction with the predictive gate circuit of FIG. 1. Furthermore, the regularly spaced pulses are applied to the demodulator (not shown) and which is connected to the signal output terminal 16′ as though there were no pulse suppression.

At the control-signal output terminal 22, a wide pulse of a $(23-n)$ microsecond duration appears $(105+n)$ microseconds after the arrival of an incoming pulse at the signal input terminal 10. In a RADA communication system, a pulse caught by the antenna reaches the signal input terminal 10 after the lapse of a time delay given mainly by the F-T matrix. It is possible to set the duration of the wide pulse so that each pulse-position modulated signal pulse, if any, may reach the antenna while the wide pulse produced by the preceding pulse-position modulated signal pulse is present. If a particular station is in communication with a remote participant station, the signal pulses sent out by a neighboring station do not pass through the F-T matrix. The electromagnetic wave reaching the particular station from the neighboring station, however, is strong enough to induce transient response in the high-frequency circuit of the receiver of the particular station and thus may mask some of the desired signal pulses. It is possible to reduce the introduction of the transient response by gating the input to the high-frequency circuit with the wide pulse obtained at the control-signal output terminal 22. Incidentally, the J–K flip-flop and the judging circuits 18 and 15′ in FIG. 3 play the same judging-control role as the judging circuit 15 in FIG. 1.

Figure 4:
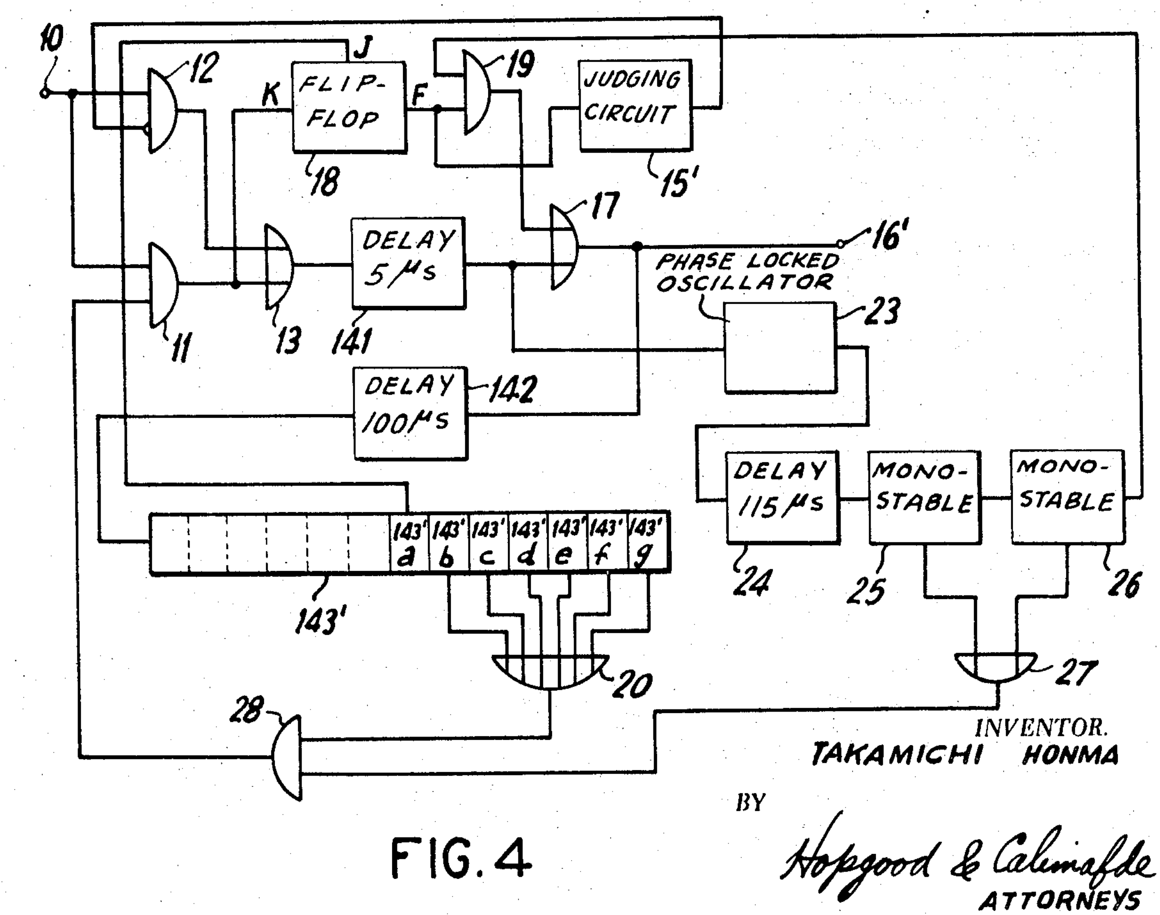

Referring now to FIG. 4, a third embodiment of this invention is similar in construction to the second embodiment of FIG. 3 except for the following. The third embodiment comprises a third delay circuit 143′ which differs from the third delay circuit 143 explained with reference to FIG. 3 in that the number of the cascaded monostable multivibrators is twenty-two and that the output terminal of the last-stage multivibrator is not connected with one of the input terminals of the second AND circuit 19. In this particular embodiment, use is not made of the at-least-three-input fourth OR circuit 21 accompanied by the control-signal output terminal 22. The third embodiment further comprises a phase-locked local oscillator 23, connected at its input terminal with the output terminal of the first delay circuit 141, for generating pulses phase-locked to the periodic component, if any, of the pulses supplied from the first delay circuit 141; and a fourth delay circuit 24, connected at its input terminal with the output terminal of the local oscillator 23, for giving a delay of 115 microseconds to each pulse supplied from the local oscillator 23. The embodiment of FIG. 4 further includes a first monostable multivibrator 25, connected at its input terminal with the output terminal of the fourth delay circuit 24, for producing a pulse of nine-microsecond duration in response to the trailing edge of each pulse supplied from the fourth delay circuit 24; a second monostable multivibrator 26 whose input terminal is connected with the output terminal of the first multivibrator 25 for producing a one-microsecond pulse in response to the trailing edge of each pulse supplied from the first multivibrator 25 and whose output terminal is connected with the other input terminal of the second AND circuit 19; a two-input fifth OR circuit 27 whose input terminals are connected with the output terminals of the first and the second multivibrators 25 and 26, respectively; and a two-input third AND circuit 28 whose input terminals are connected with the output terminals of the third and the fifth OR circuits 20 and 27, respectively, and whose output terminal is connected with the other input terminal of the first AND circuit 11.

Referring further to FIG. 4, description will be made of the operation of the combination of components specific to the third embodiment. The pulse positions of the output phase-locked pulses of the local oscillator 23 coincide with the respective average pulse positions, or the respective positions of "periodic-component" pulses, in the pulse-position modulated signal pulses derived from the first delay circuit 141 and delivered to the signal output terminal 16′. A random error pulse or pulses, even if supplied to the phase-locked local oscillator 23, can not alter the phase of the phase-locked pulses because such error pulses have no periodic component. Therefore, the output one-microsecond pulse of the second multivibrator 26 appears 125 microseconds after each "-periodic-component" pulse in the output of the first delay circuit 141 and plays the role of the regularly spaced pulses described in conjunction with the second embodiment. This one-microsecond pulse also serves to provide, in cooperation with the output nine-microsecond pulse of the first multivibrator 25, a 10-microsecond pulse at the output terminal of the fifth OR circuit 27, which is present during a ±5-microsecond period having the center at a time point 125 microseconds after each "periodic-component" pulse in the incoming pulse-position modulated signal pulse train A supplied through the signal input terminal 10 to the first AND circuit 11. The logic product of this 10-microsecond pulse and the output six-microsecond pulse of the third OR circuit 20 is used to open the first AND circuit 11. The doubled gating operation serves to raise the S/N ratio of the demodulator output. In other words, the third embodiment has the features of a predictive gate circuit of this invention and a phase-locked-oscillator time gate circuit. This embodiment, however, has the disadvantage inherent to a phase-locked local oscillator. Therefore, the predictive gate circuit of FIG. 4 manifests its excellent performance only when this disadvantage matters little.

While this invention has so far been described mainly in conjunction with that used in a pulse-position modulation RADA communication system, it should be understood that the scope of this invention covers all the predictive gate circuits set forth in the appended claims.

I claim:

1. A predictive gate circuit for improving the signal-to-noise ratio in the detection of a train of pulse position modulated (PPM) pulses comprising first and second gates each having input terminals and an output terminal with the train of pulses being operatively coupled to one of said input terminals of each of said gates, first means effectively responsive to the output of at least one of said first and second gates for setting said first gate to a conductive state to allow the input pulses of said first gate to pass through said first gate after a first predetermined period less than the sampling period of said PPM pulses from the time point of passing of said pulses through at least one of said first and second gates and for resetting said first gate to a nonconductive state to prevent the input pulses of said first gate from passing through said first gate after a second predetermined period longer than said sampling period from said time point, second means effectively responsive to the output of said first gate for setting said second gate to a nonconductive state to prevent the input pulses of said second gate from passing through said second gate in the event that the output pulse appears for a third predetermined period and for resetting said second gate to a conductive state to allow the input pulses of said second gate to pass through said second gate in the event that no output pulse appears for said third predetermined period, and an output terminal coupled to the output of said first gate.

2. A predictive gate circuit for improving the signal-to-noise ratio in the detection of a train of pulse-position modulated pulses arriving at a selected basic repetition rate with a position modulation range bearing a selected ratio to the interval between pulses occurring at the basic pulse repetition rate, comprising a pair of AND gates each having several input terminals and an output terminal with the train of pulses being effectively coupled to an input of each of said first and second AND gates, means effectively responsive to the outputs of said first and second AND gates for producing a delayed enabling pulse having a width commensurate with the position modulation range and occurring at a time interval corresponding to the interval between pulses representative of the basic pulse repetition rate, said delayed enabling pulse being applied to an input of said first AND gate to enable the gate, said enabling pulse producing means comprising first delay means effectively responsive to the outputs of said first and second AND gates for delaying said outputs for a duration exceeding one-half of the modulation range of the train of pulses, and second delay means responsive to the output of said first delay means for producing said delayed enabling pulse and a delayed zero modulation pulse at a delayed interval from the output of said first delay means with the delayed interval corresponding to the interval between pulses occurring at the basic repetition rate, and means effectively responsive to the output of said first AND gate for producing a judging pulse to an input of the second AND gate to normally disable said second AND gate during arriving train pulses and to enable said second AND gate a preselected time interval following a pulse on the output of said first AND gate, whereby output pulses are produced which are representative of the train of pulse-position modulated pulses of improved signal-to-noise ratio.

3. The device device as recited in claim 2, wherein said judging pulse producing means includes a third AND gate having a pair of inputs and an output with one input effectively responsive to the output of the first AND gate and the other input coupled to the zero modulation pulse and the output of the third AND gate coupled to the input of the second delay means.

4. The device as recited in claim 3, wherein the second delay means produces a delayed setting pulse occurring prior in time to the delayed enabling pulse and wherein the judging pulse producing means further includes a flip-flop having a set input and a reset input, with the set input responsive to the delayed setting pulse and the reset input coupled to the output of the first AND gate, said flip-flop having an output coupled to the one input of the third AND gate.

5. The device as recited in claim 4, wherein the second delay means further comprises:

- an OR circuit having a first input responsive to the output of the first delay means and having a second input responsive to the output of the third AND gate;
- an intermediate delay circuit responsive to the output of the OR circuit to delay said output for a duration less than the interval between pulse occurring at the basic repetition rate; and
- a plurality of short duration series coupled single pulse producing delay multivibrators responsive to the output of the intermediate delay with selected ones of said multivibrators being chosen to provide said setting pulse, and enabling pulse and said zero modulation pulse.

6. The device as recited in claim 5, wherein said delay means still further comprises a second OR circuit having a plurality of inputs coupled to selected multivibrators to provide said enabling pulse at the output thereof.

7. The device as recited in claim 4, wherein said second delay means further comprises:

- a phase-locked oscillator responsive to the output of the first delay means to produce output pulses in phase synchronization therewith;
- a first delay circuit responsive to the phase-locked oscillator output pulses to produce a delay less than the interval between pulses occurring at the basic repetition rate;
- a second delay circuit and a series-connected third delay circuit producing a combined pulse delay corresponding to the difference between the delay produced by the first delay circuit and said basic pulse interval, the output of said third delay circuit being representative of the zero modulation pulse;
- an OR circuit responsive to the outputs of the second and third delay circuits to provide a pulse having a width representative of the combined delay; and
- a fourth AND circuit responsive to the output of the OR circuit and the delayed enabling pulse and having an output coupled to the first AND gate.

8. A predictive gate circuit for improving the signal-to-noise ratio in the detection of a train of pulse-position modulated pulses arriving at a selected basic repetition rate with a position modulation range bearing a selected ratio to the interval between pulses occurring at the basic pulse repetition rate comprising:

- a pair of AND gates, each having several input terminals and an output terminal with the train of pulses being effectively coupled to an input of each of said first and second AND gates;
- a flip-flop having a reset input coupled to the output of the first AND gate and a set input;
- a third AND gate having several inputs and an output with one input coupled to an output of the flip-flop;
- an OR gate having several inputs and an output with one input coupled to the output of the third AND gate;
- means responsive to an output of the flip-flop for producing a judging pulse to an input of the second AND gate to normally disable said second AND gate during arriving train pulses and to enable said second AND gate a preselected time interval following a pulse on the output of said first AND gate; and
- means effectively responsive to the outputs of said first and second AND gates for producing a plurality of sequentially delayed pulses with a first delayed pulse being representative of a delayed equivalent of the outputs of said AND gates, a second delayed pulse occurring later in time than said first delayed pulse being representative of a flip-flop setting pulse, and a third delayed pulse occurring later in time than said setting pulse and being representative of an enabling pulse having a width commensurate with the position modulation range and a fourth delayed pulse occurring later in time than said enabling pulse and being representative of a zero modulation pulse and occurring after the first delayed pulse at an interval corresponding to the interval between pulses occurring at the basic pulse repetition rate with said setting pulse being coupled to the set input of the flip-flop, with the enabling pulse being coupled to an input of the first AND gate, with the zero modulation pulse being coupled to an input of the third AND Agate, and with the second delayed pulse being coupled to an input of the OR circuit to produce at the output thereof a train of pulse position modulation pulses with few error pulses.